(12) United States Patent
Duchemin et al.

(10) Patent No.: US 9,975,655 B2
(45) Date of Patent: May 22, 2018

(54) METHOD FOR COLLECTING AT LEAST ONE PRODUCT, AND EQUIPMENT ENSURING IMPLEMENTATION OF THE METHOD

(71) Applicant: C.E.R.M.E.X. CONSTRUCTIONS ETUDES ET RECHERCHES DE MATERIELS POUR L'EMBALLAGE D'EXPEDITION, Corcelles-les-Citeaux (FR)

(72) Inventors: Guillaume Duchemin, Corcelles-les-Citeaux (FR); Thierry Garnier, Corcelles-les-Citeaux (FR); Anthony Gautheron, Corcelles-les-Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days. days.

(21) Appl. No.: 15/128,566

(22) PCT Filed: Mar. 20, 2015

(86) PCT No.: PCT/FR2015/050695
§ 371 (c)(1),
(2) Date: Sep. 23, 2016

(87) PCT Pub. No.: WO2015/145039
PCT Pub. Date: Oct. 1, 2015

(65) Prior Publication Data
US 2017/0107003 A1 Apr. 20, 2017

(30) Foreign Application Priority Data
Mar. 24, 2014 (FR) ..................................... 14 00700

(51) Int. Cl.
*B65G 47/26* (2006.01)
*B65B 21/06* (2006.01)
(Continued)

(52) U.S. Cl.
CPC ................ *B65B 21/06* (2013.01); *B65B 7/16* (2013.01); *B65B 35/30* (2013.01); *B65G 15/00* (2013.01); *B65G 47/088* (2013.01); *B65G 47/82* (2013.01)

(58) Field of Classification Search
CPC .... B65G 47/088; B65G 47/82; B65G 47/082; B65B 21/06
(Continued)

(56) References Cited

U.S. PATENT DOCUMENTS

| 3,718,246 A * | 2/1973 | Dardaine et al. ....... B65B 21/06 198/419.3 |
| 6,223,884 B1 * | 5/2001 | Ronchi .................... A42B 3/08 198/431 |

(Continued)

FOREIGN PATENT DOCUMENTS

| DE | 27 11 702 A1 | 9/1978 |
| EP | 2 202 183 A1 | 6/2010 |

(Continued)

OTHER PUBLICATIONS

International Search Report, dated Jun. 2, 2015, from corresponding PCT Application.

*Primary Examiner* — William R Harp
(74) *Attorney, Agent, or Firm* — Young & Thompson (57) ABSTRACT

Disclosed is a method for collecting at least one product from among a line of products arriving in a lined-up fashion one behind the other on a conveyor. The conveyor has a path, for conveying the products, and a conveying direction. The method uses at least one collector of at least one product.

(Continued)

The collector includes at least one first receptacle capable of accommodating at least one product. The collector is movably mounted along the path for conveying the products in the conveying direction and in the opposite direction. The method includes at least one first step for collecting the at least one product in the at least one receptacle by moving the at least one collector over the conveyor on the conveying path and in the conveying direction.

17 Claims, 5 Drawing Sheets (51) Int. Cl.
*B65B 35/30* (2006.01)
*B65B 7/16* (2006.01)
*B65G 15/00* (2006.01)
*B65G 47/08* (2006.01)
*B65G 47/82* (2006.01)

(58) Field of Classification Search
USPC .............................................. 198/418, 418.7
See application file for complete search history.

(56) References Cited

U.S. PATENT DOCUMENTS

| | | | | |
|---|---|---|---|---|
| 8,167,113 B2* | 5/2012 | Mougin | ............... | B65G 47/088 198/370.07 |
| 8,464,501 B2* | 6/2013 | Mougin | ................. | B65G 57/32 53/152 |
| 8,485,342 B2* | 7/2013 | Mougin | ............... | B65G 47/082 198/370.07 |
| 8,668,072 B2* | 3/2014 | Gatos | ................... | B65G 47/088 198/429 |
| 8,695,781 B2* | 4/2014 | Mougin | ............... | B65G 47/088 198/426 |
| 9,132,970 B2* | 9/2015 | Duchemin | ........... | B65G 47/088 |
| 9,315,338 B2* | 4/2016 | Peterman | ................ | B65G 47/29 |
| 2010/0140052 A1* | 6/2010 | Martini | ................ | B65G 47/082 198/419.2 |
| 2010/0193326 A1 | 8/2010 | Mougin | | |
| 2010/0282574 A1* | 11/2010 | Ueda | .................... | B65G 17/323 198/803.3 |
| 2012/0118701 A1 | 5/2012 | Duchemin et al. | | |
| 2012/0273324 A1 | 11/2012 | Mougin | | |

FOREIGN PATENT DOCUMENTS

| | | |
|---|---|---|
| FR | 2 415 578 A1 | 8/1979 |
| FR | 2 918 359 A1 | 1/2009 |
| FR | 2 948 650 A1 | 2/2011 |
| FR | 2 954 756 A1 | 7/2011 |
| GB | 2 174 667 A | 11/1986 |
| WO | 2008/022296 A2 | 2/2008 |

* cited by examiner

METHOD FOR COLLECTING AT LEAST ONE PRODUCT, AND EQUIPMENT ENSURING IMPLEMENTATION OF THE METHOD

BACKGROUND OF THE INVENTION

The invention relates to a method for collecting at least one product from among a line of products, so as to move this product onto a deposition station that is located close to the line of products.

In an advantageous embodiment of the invention, the latter has as its objective to create batches of products on the deposition station.

The grouping of products of the flask, bottle or other type can be done in multiple ways depending on the type and the nature of the products and also depending on the desired throughput.

A form of grouping is described in the application GB2174667. The products arrive in a line on a conveyor, and they are picked up, on the fly, by a pusher device that carries a batch of products.

The pusher device comes in the form of a rack that is arranged longitudinally, on the side of the line of products. This rack is driven by a movement combined with a loop: both a longitudinal movement in the direction of advance of the products and a transverse movement for depositing the batch of products in a row, on the side of the conveyor, where they are then taken up by other means.

This pick-up device may not undergo any disruption at the level of the distribution of the products on the conveyor. The batch of products should actually be perfectly set up to be picked up by the pusher.

So as to resolve the drawbacks of the grouping device described in the document GB 2 174 667, a new installation of the type of the one described in the application FR 2 918 359 has been developed.

The document FR 2 918 359 describes an installation that comprises:
 A conveyor of products, the conveyor having a path of travel and a direction of travel,
 A deposition station, contiguous to the conveyor,
 At least one collector comprising at least one receptacle that can collect at least one product, said at least one receptacle being directed in the path of travel of the products, with the collector being mounted to move along a path that is parallel to the path of travel and along a path that is transverse to the path of travel in a plane that is perpendicular to the conveyor.

Such an installation has certain drawbacks: on the one hand, when the products enter into the collector, they are abruptly stopped in their movement, which tends to destabilize them. The products can thus pick up a pendulum motion that can cause them to fall. On the other hand, the processing throughput of such an installation is limited.

It has been proposed, to increase the throughput, to increase the number of collectors used in the installation, as the documents FR 2 948 650 and FR 2 954 756, in particular, show.

SUMMARY OF THE INVENTION

The purpose of the invention is to improve the state of the art as described, and aims in particular to increase the throughput and/or to resolve the problem of stability during receipt.

Thus, in a first step, the invention relates to a method for collecting at least one product from among a line of products that arrive lined up one behind the other on a conveyor, with said conveyor having a path of travel of the products and a direction of travel, said method using at least one collector of at least one product, with said collector comprising at least one first receptacle that can receive at least one product, said collector being mounted to move along the path of travel of the products in the direction of travel and in the opposite direction. The method is noteworthy in that it comprises at least one first stage for collecting said at least one product in said at least one receptacle by moving said at least one collector above the conveyor in the path of travel and in said direction of travel.

The advantage of collecting the products by moving the collector in the direction of travel of the products is twofold. The relative speed of the product in relation to the collector can end in an impact of the product against it, or else impacts between the products. On the one hand, the entry of a product into the receptacle is cushioned because the receptacle is moving in the same direction. On the other hand, the collecting is done at the same time as the product advances, which makes it possible to combine two stages, namely movement and collection, and makes it possible to increase the throughput.

The method in accordance with the invention can also comprise the following characteristics, taken separately or in combination:
 The method can use at least one collector that is mounted to move vertically, and it can comprise a stage for positioning said at least one collector at the height of the products above said conveyor by movement of the collector along an essentially vertical path, for making possible said at least one first stage for collecting said at least one product in said at least one receptacle;
 The method can use a collector comprising a second receptacle, said first and second receptacles being contiguous and oriented along the same path, and the method can comprise at least one second stage for collecting at least one second product in said at least one second receptacle by lateral offsetting of said collector after said at least one product is put into said at least one first receptacle;
 During the second stage for collecting said at least one second product in said at least one second receptacle, the collector can also be moved along the path of travel;
 After said at least one first and second collecting stages, said at least one first and second receptacles can be closed, so as in particular to prevent any rocking movement of the collected products;
 The method can comprise a stage for deposition of said at least one collected product, by lateral movement of said collector to a deposition station positioned on the side of the conveyor;
 The method can use at least two collectors each comprising at least one receptacle that can receive at least one product;
 Said at least two collectors can be used at the same time for collecting said at least one product in each of said at least one receptacle;
 Said at least two collectors are used in turn for collecting said at least one product in said at least one receptacle;
 The method can use multiple pairs of collectors, each comprising at least one receptacle that can receive at least one product, with said pairs of collectors being used in turn.

The object of the invention is also an installation such as the one used in the document FR2 918 359, which is, however, noteworthy in that the collector is able to move in the direction of travel when it is positioned above the conveyor.

The installation in accordance with the invention can also comprise the following characteristics, taken separately or in combination:

Said at least one collector can be mounted to move along an essentially vertical path;

The installation can comprise means for closing said at least one receptacle.

BRIEF DESCRIPTION OF THE DRAWINGS

To be able to be implemented, the invention is disclosed in a way that is sufficiently clear and complete in the following description that is, in addition, accompanied by drawings in which.

DETAILED DESCRIPTION OF THE PREFERRED EMBODIMENTS

In the following description, the terms "lower," "upper," "top," "bottom," etc., are used with reference to the drawings for a greater ease of understanding. They should not be understood as being limitations of the scope of the invention.

The invention therefore first of all has as its object a method for collecting at least one product 3 from among a line of products 3 arriving lined up one behind the other on a conveyor 2, with said conveyor 2 having a path of travel X of the products and a direction of travel S, with said method using at least one collector 1; 1' of at least one product 3, said collector 1; 1' comprising at least one first receptacle 7 that can receive at least one product 3, said collector 1; 1' being mounted to move along the path of travel X of the products 3 in the direction of travel S and in the opposite direction.

According to the invention, the method comprises at least one first stage for collecting said at least one product 3 in said at least one receptacle 7 by moving said at least one collector 1; 1' above the conveyor 2 in the path of travel X and in said direction of travel S. This movement of the collector can be done at the height of the product 3, which then requires spacing between the products 3 so that said collector can be inserted. This movement can also be done above the products 3, with the collector being put into the stream of products 3 by the top, where the interval between the products 3 then can be smaller since it is not necessary to pass the teeth of the comb between two products 3 that follow.

Thus, in particular embodiments, the method comprises a stage for positioning said at least one collector 1; 1' at the height of the products 3 above said conveyor 2 by movement of the collector 1; 1' along an essentially vertical path to make it possible for said at least one first stage for collecting said at least one product 3 in said at least one receptacle 7.

Such a movement of insertion by the top makes it possible, i.a., to increase the flow rate of product 3 since it is not necessary to create a space to allow the collector to circulate transversely.

In particular embodiments, using at least one collector 1; 1' comprising a second receptacle 7, said first and second receptacles 7 being contiguous and oriented along the same path X, said method comprises at least one second stage for collecting at least one second product 3 in said at least one second receptacle 7 by lateral offsetting of said at least one collector 1; 1' after said at least one product 3 is put into said at least one first receptacle 7. The collector is then used to form packets of products organized into a matrix, i.e., in the form of multiple columns of products that are beside one another, each accommodated in a particular receptacle.

According to a possible additional characteristic, during the second stage for collecting said at least one second product 3 in said at least one second receptacle 7, the collector 1; 1' is also moved along the path of travel X, in particular in the direction of travel of the products 3, so as to minimize the impact and also to prevent having to space the products 3 for the circulation of the collector.

According to another possible additional characteristic, the method comprises a stage that consists essentially in closing the receptacle 7 after having collected there the collection of the products 3. Thus, once the receptacle 7 is filled with products, it is closed, in particular closed from the side opposite to the bottom against which the first product 3 comes during the collection.

In particular embodiments of the method, it comprises a stage for deposition of said at least one collected product 3 by lateral movement of said collector 1; 1' to a deposition station 4 positioned on the side of the conveyor 2.

So as to avoid down time and therefore to increase the throughput, in certain particular embodiments, the method uses at least two collectors 1, 1', each comprising at least one receptacle 7 that can receive at least one product 3. According to a possible additional characteristic, said at least two collectors 1; 1' are used together for collecting said at least one product 3 in each of said at least one receptacle 7. More specifically, the collectors can act one after the other, in such a way that then, at least two collectors 1, 1' are used in turn for collecting said at least one product 3 in said at least one receptacle 7. The collecting can also be done by collectors controlled in pairs, with each pair processing a portion of the product column and another pair collecting another part of the column after release. In these embodiments, the method uses multiple pairs of collectors 1, 1', each comprising at least one receptacle 7 that can receive at least one product 3, with said pairs of collectors 1, 1' being used in turn.

The invention also has as its object an installation for the implementation of such a method and that comprises a conveyor 2 of products 3, with said conveyor 2 having a path of travel X and a direction of travel S, a deposition station 4, contiguous to the conveyor 2, as well as at least one collector 1; 1' that comprises at least one receptacle 7 that can collect at least one product 3, said at least one receptacle being oriented in the path of travel of the products, with said collector 1; 1' being mounted to move along a path that is parallel to the path of travel X and along a path that is transverse to the path of travel X in a plane that is perpendicular to the conveyor 2.

According to the invention, the at least one collector 1; 1' is able to move in the direction of travel S when it is positioned above the conveyor 2.

In a first step, reference will be made to FIG. 1 for describing in detail an embodiment of an installation in accordance with the invention.

In a second step, reference will be made to FIGS. 2 to 8 for describing the method of operation of an installation in accordance with the invention, which comprises four collectors 1.

It should, however, be understood that the installation in accordance with the invention is not limited to the presence of four collectors. Actually, the installation could comprise only a single collector, or two, or three, or more than four collectors.

Likewise, in the embodiment that will be described, the collectors are used two by two.

It should be understood that the invention is not limited specifically to such an implementation.

Figure 1:
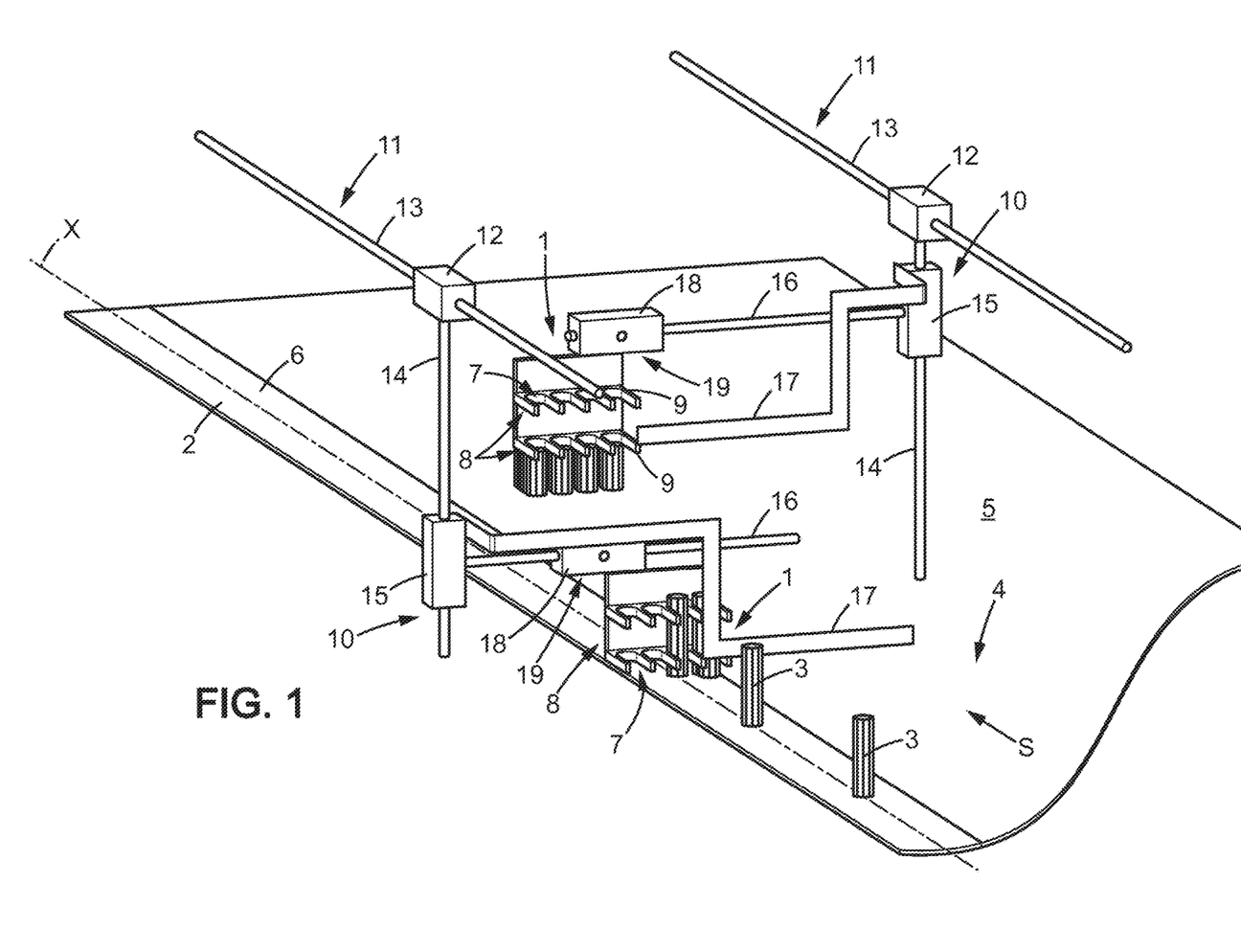
FIG. 1 is a perspective view of certain elements of an installation in accordance with the invention, illustrated diagrammatically.

FIG. 1 shows a conveyor 2 on which products 3 arrive lined up one behind the other.

The conveyor 2 has a path of travel X of the products 3, and a direction of travel S, shown in FIG. 1 in particular.

A deposition station 4 is contiguous to the conveyor 2. More particularly, the deposition station 4 has a deposition belt 5 that is located at the same level as a belt 6 of the conveyor 2, in such a way that the products 3 can be slid from one belt 6 to another 5.

The belt 5 of the deposition station 4 can be stationary, or it can be driven in movement.

According to the invention, the installation comprises at least one collector, and in particular, according to the embodiment shown in FIG. 1, the installation comprises two collectors 1.

Each collector 1 comprises one or two combs 8 that are lined up vertically one above the other, having teeth 9 that are also lined up vertically one above the other. The spaces between the teeth 9 of the two superposed combs constitute receptacles 7, able to collect at least one product 3.

The receptacles 7 are directed facing toward the arrival of the products 3.

To do this, the spacing between the teeth 9 of the combs 8 of the collector is at least slightly greater than the width of the products 3. The vertical spacing between the two combs 8 ensures a partial hold of the product at the top part and at the bottom part.

It should be understood that a collector could be produced differently without exceeding the scope of the invention. In particular, the collector could comprise only a single comb, and even only a single receptacle. In this latter case, the comb would have only two teeth and would have a U shape.

The teeth 8 of the combs 9 are long enough to receive multiple products 3 in a line in each receptacle 7.

However, it should be understood that the receptacles 7 would be able to receive only a single product each without exceeding the scope of the invention.

Each of the collectors 1 is mounted on a device 10, carried by a frame.

In FIG. 1, only two brackets 11 of the frame have been shown, in such a way as to simplify the reading of the figure. The brackets 11 have paths parallel to the path of travel X of the products.

The devices 10 are mounted to move along the brackets 11 in such a way that the devices 10 and the collectors 1 that they comprise can also move along a path that is parallel to the path of travel of the products 3. The fact that the devices 10 are able to move on the brackets 11 has been shown diagrammatically by a sleeve 12 with a square cross-section, shrunk-on around a rod 13 of the bracket 11.

Each of the sleeves 12 is attached to the end of another vertical rod 14, which is perpendicular to the rod 13 of the bracket 11 and on which a second sleeve 15 is shrunk-on.

The sleeve 15 can also move on the vertical rod 14 in such a way that the device 10 (carrying the collector 1) can be driven by an up-and-down motion above the conveyor 2 and the deposition station 4.

The sleeve 15 carries a rod 16, perpendicular to the rod 15 and transverse to the path of travel X, and in particular perpendicular to the path of travel X.

An articulated arm 17 is also attached to the second sleeve 15, whose usefulness will be defined below.

The rod 16 forms a transverse bracket above the conveyor 2.

An element 18 is mounted to move on the rod 16 that forms a bracket. It is thus driven by a transverse movement in relation to the path of travel of the conveyor 2. The element 18 is equipped with means 19, located below the element 18, with the means 19 making possible the attachment of the collector 1.

The collector 1 can thus be driven:

By a movement that is transverse to the path of travel X of the products on the conveyor 1, thanks to the fact that the element 18 is able to move on the rod 16;

By a longitudinal movement following a path parallel to the path of travel X of the products 3 on the conveyor 1, thanks to the fact that the sleeve 12 is able to move on the rod 13 of the bracket 11, And by a vertical up-and-down motion, thanks to the fact that the sleeve 15 is able to move on the rod 14.

Thus, the collector 1 can be both driven by a movement in the direction of travel of the products 2 and positioned above the conveyor 2.

It can thus collect products 3 in the receptacles 7 by moving in the same direction and along the same path as the products 3.

Thanks to the fact that the device 10 makes possible a vertical movement of the collector 1, it can also be put into a line of products 3 lined up one behind the other, as will be seen below.

The articulated arm 17 has a stationary position in relation to the second sleeve 15.

Thus, when the collector 1 is moved along the rod 16 by movement of the element 18, the articulated arm 17 remains immovable.

Thus, the collector can adopt different positions in relation to the articulated arm 17.

The articulated arm 17 makes it possible to close the receptacles 7 when one or more products are put into the receptacle 7, by moving the collector toward (or away from—depending on the representation) the sleeve 15. It then constitutes a counter-comb for closing the receptacles 7 of the collector 1.

The articulated arm or counter-comb 17 has as its function to hold in place the products collected in the receptacles, during the movement of the collector. Actually, since the products are collected while they move, when they enter into the collector, they have a tendency to rock and run the risk of falling backward. By closing the receptacles that are filled with products, the products are prevented from rocking backward.

In addition, the articulated arm or counter-comb 17 makes it possible to hold the products in the collector during its movement.

Since the articulated arm 17 is also attached to the sleeve 15, it is driven by an up-and-down motion and by a movement of displacement that is parallel to the path of travel of the products, in the direction of travel, and in the opposite direction (depending on whether the sleeve 12 is moved in one direction or the other on the rod 13).

The movements of the collectors 1 and the counter-combs (or articulated arms) 17 are therefore integral in the vertical direction (up-and-down motion) and along a path parallel to the path of travel of the products.

It should be understood that the movements of the collectors and counter-combs could be different without, however, exceeding the scope of the invention. For example, the counter-comb could be associated with a different actuator from that of the collector to make it possible for it to move vertically independently of the collector. This would make it possible in particular to release the counter-comb vertically in the deposition station without the collector being evacuated. A method for using the installation will now be described by referring to FIGS. 2 to 8 that show the position of multiple collectors of the same installation at different stages of the collecting method.

In FIGS. 2 to 8, it will be noted that the entire installation has not been shown.

Only the following elements have been shown: the conveyor 2, the deposition station 4, the products 3, and four collectors with their respective counter-combs.

FIG. 1 showed an installation using two collectors 1 that were used in turn (one collected the products 3 while the other remained in the retracted position above the conveyor 2 waiting at the end of the collecting of the other collector).

FIGS. 2 to 8 show the implementation of four collectors, with the collectors being used two by two.

This means that two collectors are put on standby, in the retracted position above the conveyor, during which the other two collectors collect products in their receptacles 7 in a lower position.

The two collectors, working simultaneously, essentially carry out the same movements at the same times. Only the deposition movements of the collected products are different.

Thus, so as to better understand the cycle of the two pairs of collectors, two references have been attributed to the collectors: two collectors bear the reference 1 and work essentially simultaneously. The other two collectors bear the reference 1', and they also work essentially simultaneously but offset in time in relation to the collectors 1; the collectors 1' are only involved when the collectors 1 have collected and are in the phase of depositing products in the deposition station.

It should be understood that the collectors could be driven in a different way. For example, the collectors could work essentially simultaneously if, and only if, the selector with lateral bands sent a train of products corresponding to their filling.

If the products arrived in a random way, the collectors could not be at all synchronized without exceeding the scope of the invention.

Figure 2:
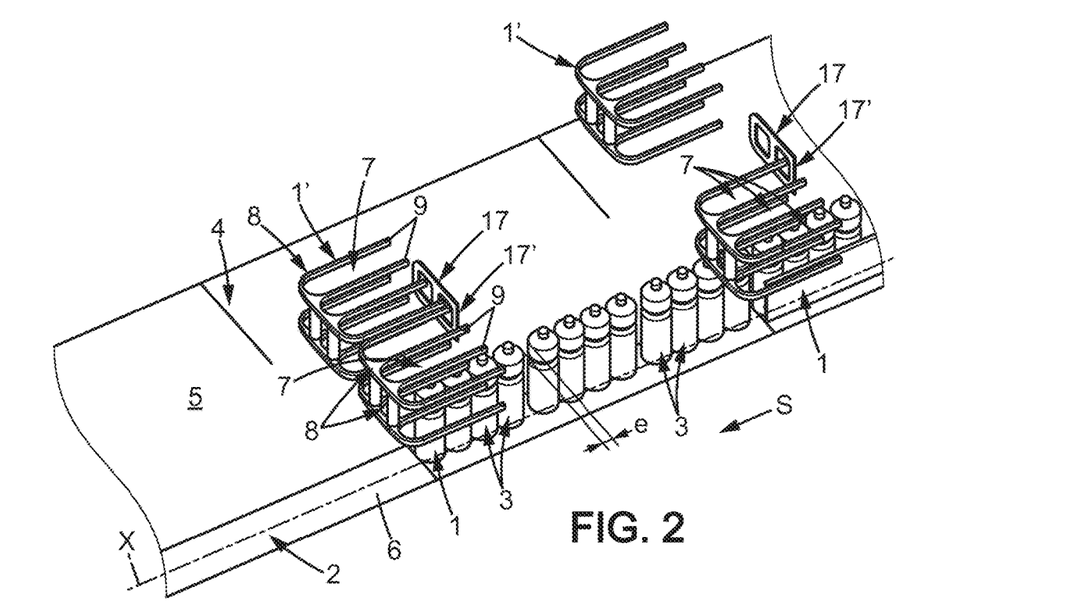
FIGS. 2 to 8 are perspective views that also show certain elements of an installation in accordance with the invention, in different stages of the method in accordance with the invention.

Thus, FIG. 2 shows four collectors 1 and 1' in the upper position: two collectors 1 placed above the conveyor 2, ready to begin a collecting cycle. The other two collectors 1' are located above the deposition station 4, depending on an end-of-cycle position that is specific thereto.

The counter-combs 17 (of the collectors 1) and 17' (of the collectors 1') are superposed.

The collectors 1 and 1' are all identical: they each comprise three receptacles, adjacent to one another, directed facing the same path, and each able to receive four products that are lined up.

It should be understood that the collectors could receive a different number of products, larger or smaller, without exceeding the scope of the invention.

In FIG. 2, the products 3 arrive lined up one behind the other, in groups of four products each.

In other words, a space e has been left between two groups of consecutive products 3. In the case of the example presented, the space e between each group of products is smaller than the width of a single product 3.

The groups of four products have been formed prior to the collection.

The purpose of the example that is described and illustrated is to create, in the deposition station, batches of 12 products, lined up in 3 lines corresponding to the lines of products each entering into the three receptacles of the collectors 1 and 1'.

As has been mentioned above, the collectors 1 and 1' are all able to be moved following three paths, among which is the path of travel X of the products 3.

The collecting of the products 3 by the collectors 1 will now be described.

The collectors 1 are first of all positioned above the conveyor 2. FIG. 1 shows that one of the three receptacles 7 of each of the two collectors 1 is positioned perpendicular to the line that is formed by the products on the conveyor 2.

When two groups of four products 3 are positioned just below two receptacles 7 of two collectors 1 (with a group of products 3 being positioned below and perpendicular to a receptacle of each of the two collectors 1), the collectors 1 are moved at a speed that is essentially identical to the speed of the collector, in such a way that the position of each of the two groups of four products 3 remains the same in relation to the positions of the receptacles 7 of the collectors 1.

While continuing to advance at the same speed as the conveyor 2, the two collectors 1 are moved vertically downward to a certain height above the conveyor 2, said certain height corresponding to a height of product 3.

A height such that the receptacles face at least one part of the products 3 positioned on the conveyor 2 will be understood by "product height."

Figure 3:
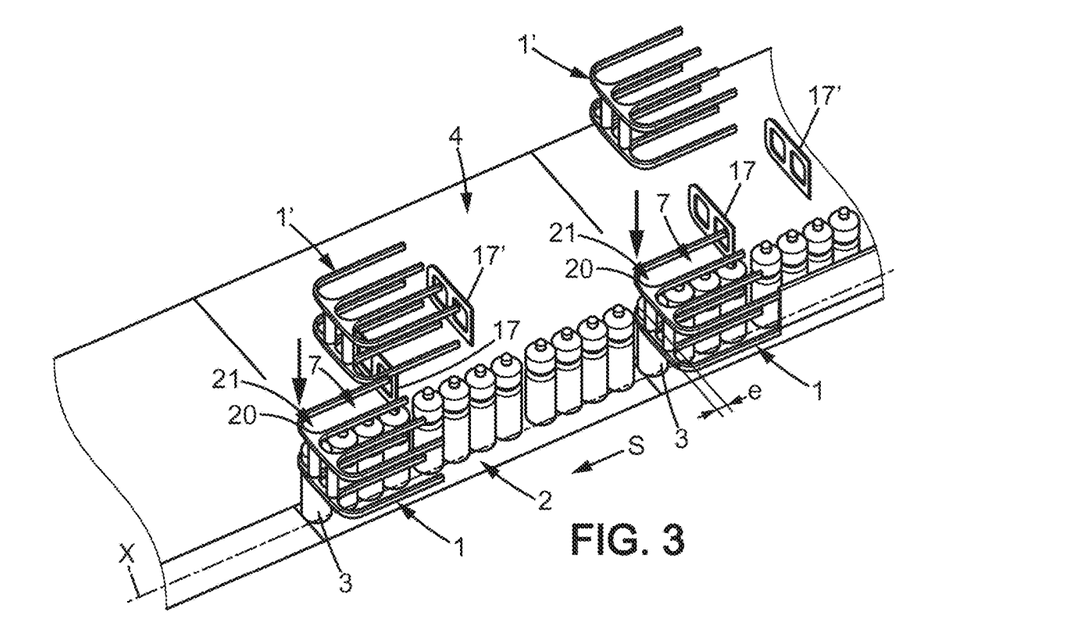

By lowering the collectors 1 toward the bottom, the products 3 (of a first group of four products 3) are put into the first receptacle 7 of each of the two collectors 1, as can be seen in FIG. 3.

The space e left between two groups of four products 3 on the conveyor 2 is enough to allow the collector 1 to be inserted between two groups of products 4.

Thus, the vertical movement of the collectors 1 makes it possible to be able to insert into a receptacle a certain number of products without having to leave large spaces between each group of products 3 that is lined up on the conveyor 2, as is the case for a transverse horizontal movement of the collector 1 in such a way as to bring the receptacle into the extension of the line of products.

It is enough for the collector to have a thickness of wall 20 of the bottom 21 of the receptacle that is less wide than the space e left between two groups of products 3.

In this way, the products 3 can be picked up by being clustered together more closely one behind the other, which helps to increase the throughput for carrying out the grouping of products 3.

It will be noted that the first group of four products is also collected by simultaneously moving the collector in the same direction as the conveyor 2. This also makes it possible to increase appreciably the throughput of the processing of products, because the products continue to advance when they are picked up by the collector. There are therefore more products 3 that circulate on the conveyor 2.

In addition, when the products 3 are inserted into the receptacles 7 of a collector 1 that advances in the same path and in the same direction as the path and the direction of travel of the products 3, the collection is done by limiting the impact when the first product of the group of four products reaches the bottoms 21 of the receptacles.

After a first group of four products 3 is inserted into the first receptacle 7 of the collectors 1, the latter move laterally toward the deposition station 4. In this way, the second receptacles 7 of the collectors 1 are in the lining-up of products 3 to the conveyor 2 (see FIG. 4). In addition, the lateral offsetting of the collectors 1 moves the first receptacle 7, filled with four products 3, behind the counter-comb 17, which thus closes the receptacle 7.

Figure 4:
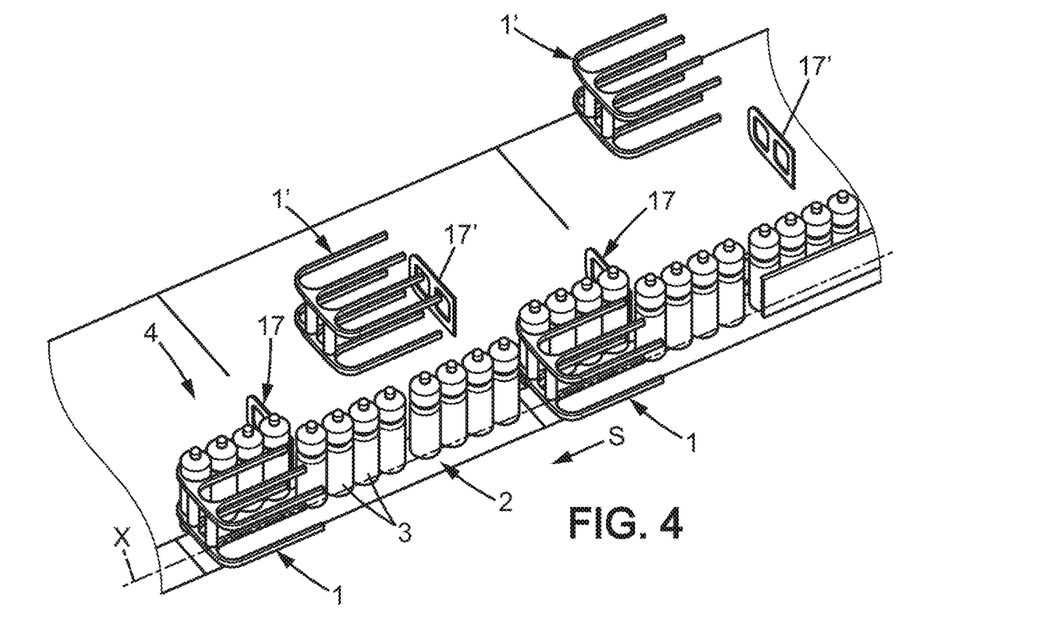

In FIG. 4, the collectors 1' still do not move.

The movement of the collectors 1 in the path of travel and in the direction of travel of the products 3 is stopped promptly, to allow a second group of four products 3 to be put into the second receptacle 7 of each collector 1.

However, just before the first product 3 of the group of products 3 reaches the bottom 21 of the second receptacle, the collector is again driven in movement in the direction of travel and in the path of travel. This makes it possible, as indicated above, to cushion the receiving of the group of products 3 by movement into the second receptacle 7 (see FIG. 5). Of course, the speed of movement of the collector follows a profile that can be adjusted, in particular to the type of product and to its characteristics, such as weight, dimensions, etc.

Figure 5:
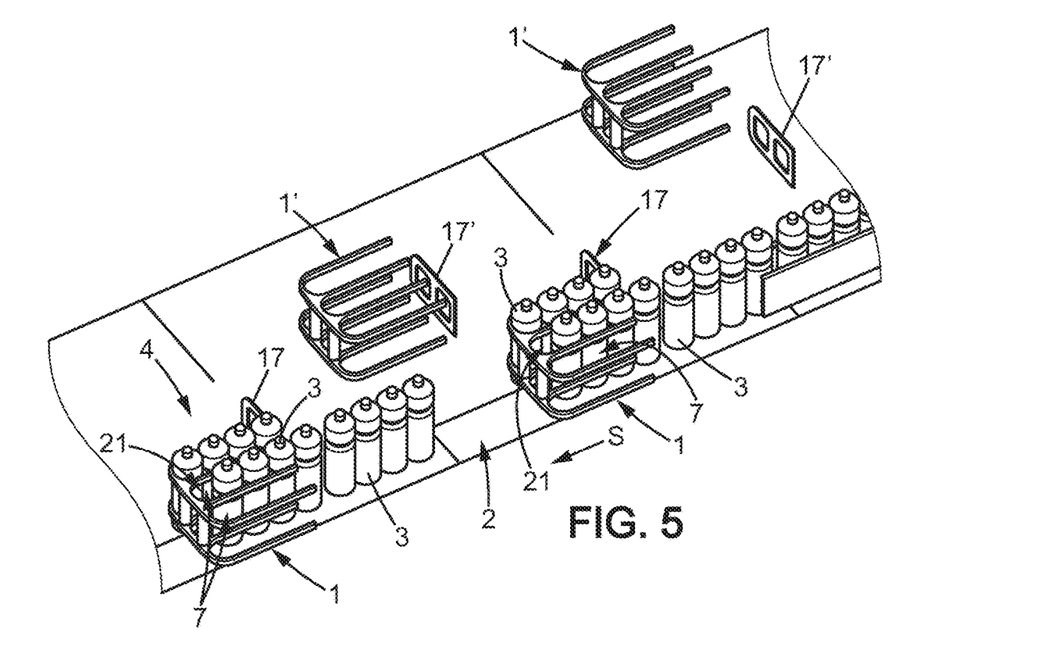

The collectors 1' still do not move from their upper position (see FIG. 5).

Figure 6:
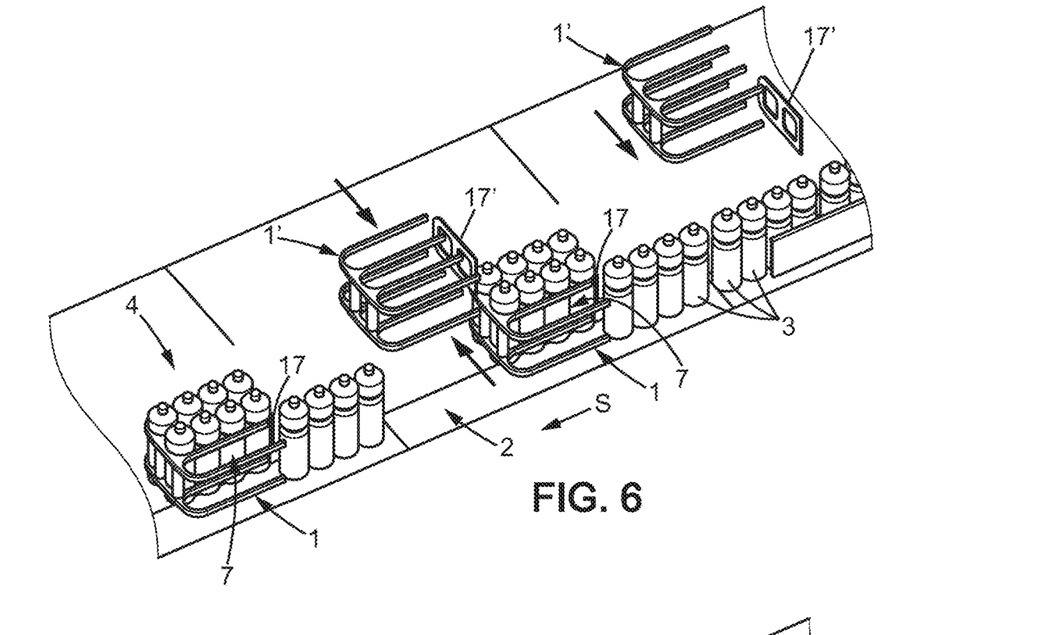

Then, the collectors 1 are again offset toward the deposition station 4 to line up the third and last receptacle 7 with the products 3 that are lined up on the conveyor 2 (FIG. 6).

At the time when the collectors 1 are offset laterally, the second receptacles that are full are positioned behind the counter-combs 17 that do not move in relation to the deposition station.

In addition, at the same time as the lateral offset of the collectors 1 toward the deposition station, the collectors 1' also move, in the upper position, for the purpose of lining up their first receptacle 7 perpendicular to the row of products 3 that are lined up on the conveyor 2, above the conveyor 2 (see arrows of movement of the collectors 1 and 1' in FIG. 6).

Figure 7:
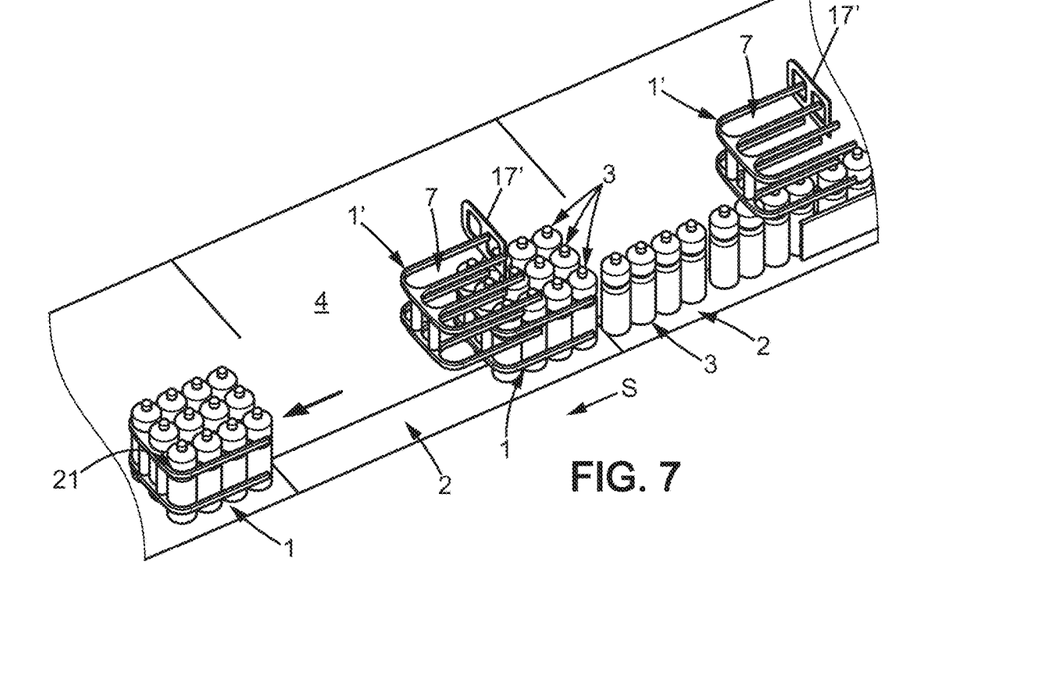

To collect the third group of four products 3 in their last free receptacle 7, the collectors 1 are first of all stopped in their movement in such a way as to allow the products 3 to penetrate into their free receptacle 7.

Then, just before the first product 3 of the group reaches the bottom 21 of the receptacle 7, the collectors are again driven in movement in the path and in the direction of travel of the products, to ensure cushioning (see FIG. 7).

The collectors 1', in the upper position in the installation, continue their movement for the purpose of positioning a first receptacle 7 above the line of products 3, above the conveyor 2.

Figure 8:
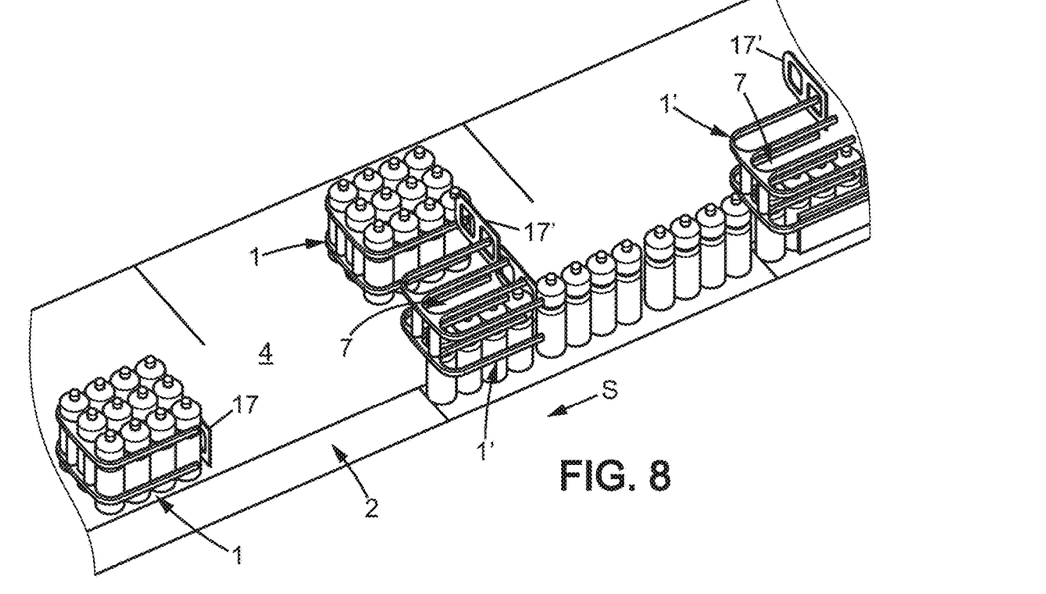

When the last groups of four products 3 are inserted into the last receptacles 7 of the collectors 1, the latter are again offset laterally on the deposition station 4.

According to the lateral offsetting performed by each of the collectors 1 on the deposition station 4, the two batches of products 3 are positioned at different or identical distances from the conveyor 2. In the case of the example that is illustrated in FIG. 8, the two collectors 1 are offset laterally according to different distances, such that the two groups (or batches) of collected products 3 are not lined up on the deposition station 4.

The position of each of the collectors 1 on the deposition station can easily be controlled by one skilled in the art by programming the distances of lateral movement of each of the collectors 1.

At the time when the collectors 1 position the batches of products collected on the deposition station 4, the collectors 1' are correctly positioned above the conveyor 2 to begin a new collection cycle.

The collectors 1 are raised into the upper position in the installation and are put on standby.

It will be understood from the preceding description how the invention makes it possible to improve the throughput, in particular by driving the collector by a movement that is similar to the advance of the products, simultaneously to the collection, by ensuring the collection in the direction of advance and in the path of advance of the products 3.

It will also be easily understood that the lining-up, through the top, of the collectors in the line of products makes it possible to leave small distances between the products, which makes it possible to have a higher throughput.

It should be understood that the invention is not limited to the embodiment that is specifically described and that it extends to the implementation of any equivalent means.

The invention claimed is:

1. A method for collecting at least one product from among a line of products that arrive lined up one behind the other on a surface of a conveyor, said conveyor extending along a path of travel (X) of the products for conveying the products in a direction of travel (S), said method comprising:

providing at least one collector configured to collect at least one product from the conveyor, said collector comprising at least two elongated members joined by a common connecting member, the two elongated members extending from the common connecting member in a direction parallel to the direction of travel (S), and being spaced apart from one another in a direction of a width of the surface of the conveyor transverse to the direction of travel (S), the at least one collector providing at least one first receptacle constituted by a gap between said two elongated members formed by said spacing of said elongated members apart from one another, said at least one first receptacle configured to receive at least one product, said collector being mounted to move in the path of travel of the products both in the direction of travel and in a direction opposite the direction of travel; and at least one first stage of collecting said at least one product in said at least one first receptacle, including:
moving said at least one collector above the conveyor in the path of travel and in said direction of travel, as said at least one collector moves above the conveyor,
lowering said at least one collector vertically downward in a direction toward the conveyor to a height above the conveyor where the common connecting member of the at least one collector faces said at least one product, and
receiving said at least one product inside the at least one first receptacle of the at least one collector.

2. The method according to claim 1,
wherein said at least one collector includes a second receptacle, said first and second receptacles being contiguous and oriented along a same path, and wherein said method further comprises:
at least one second stage of collecting at least one second product in said at least one second receptacle, including:
laterally offsetting said at least one collector along the direction of the width of the surface of the conveyor after said at least one product is received into said at least one first receptacle.

3. The method according to claim 2, wherein, during the second stage, the collector is also moved along the path of travel in the direction of travel of the products.

4. The method according to claim 3, further comprising:
a stage of closing the at least one first receptacle of said collector after the at least one product has been collected therein, including:
moving the collector relative to a closing member so that the closing member closes an open end of the gap between the elongated members and thereby holds the at least one product in place in the at least one first receptacle during movement of the collector.

5. The method according to claim 3, further comprising:
a stage of depositing said at least one collected product, including:
laterally moving said collector along the direction of the width of the surface of the conveyor to a deposition station positioned at a side of the conveyor.

6. The method according to claim 2, further comprising:
a stage of closing the at least one first receptacle of said collector after the at least one product has been collected therein, including:
moving the collector relative to a closing member so that the closing member closes an open end of the gap between the elongated members and thereby holds the at least one product in place in the at least one first receptacle during movement of the collector.

7. The method according to claim 2, further comprising:
a stage of depositing said at least one collected product, including:
laterally moving said collector along the direction of the width of the surface of the conveyor to a deposition station positioned at a side of the conveyor.

8. The method according to claim 1, further comprising:
a stage of closing the at least one first receptacle of said collector after the at least one product has been collected therein, including:
moving the collector relative to a closing member so that the closing member closes an open end of the gap between the elongated members and thereby holds the at least one product in place in the at least one first receptacle during movement of the collector.

9. The method according to claim 1, further comprising:
a stage of depositing said at least one collected product, including:
laterally moving said collector along the direction of the width of the surface of the conveyor to a deposition station positioned at a side of the conveyor.

10. The method according to claim 1, wherein at least two collectors are used, each of said at least two collectors comprising at least one receptacle configured to receive at least one product.

11. The method according to claim 10, wherein said at least two collectors are used together for collecting said at least one product in each of said at least one receptacle.

12. The method according to claim 10, wherein said at least two collectors are used in turn for collecting said at least one product in said at least one receptacle.

13. The method according to claim 1, wherein multiple pairs of collectors are used, each comprising at least one receptacle configured to receive at least one product, each of said pairs of collectors (1, 1') being used in turn.

14. The method according to claim 1, wherein during the first stage of collecting, the moving of said at least one collector above the conveyor advances said at least one collector at a same speed as the conveyor.

15. The method according to claim 1, wherein said collector is in the form of a comb comprising three or more elongated members as teeth that are each spaced from each other to form receptacles between the teeth to receive the products.

16. An installation for the implementation of the method according to claim 1, comprising:
a conveyor of the products, said conveyor having a path of travel and a direction of travel;
a deposition station, contiguous to the conveyor; and
at least one collector that comprises at least one receptacle configured to collect at least one product,
said at least one receptacle being oriented in the path of travel of the products,
said collector being mounted to move along a path that is parallel to the path of travel and along a path that is transverse to the path of travel in a plane that is perpendicular to the conveyor,
the at least one collector configured to move in the direction of travel when the at least one collector is positioned above the conveyor, and to move vertically in a direction toward the conveyor to a height above the conveyor to receive said at least one product into said at least one receptacle.

17. The installation according to claim 16, further comprising:
means for closing said at least one receptacle.

* * * * *